May 26, 1964  A. N. KAISER  3,134,125
WINDSHIELD WIPER AND WASHER ASSEMBLY
Filed May 21, 1962  4 Sheets-Sheet 1

INVENTOR.
ARTHUR N. KAISER
BY
Souther & Stoltenberg
ATTORNEYS

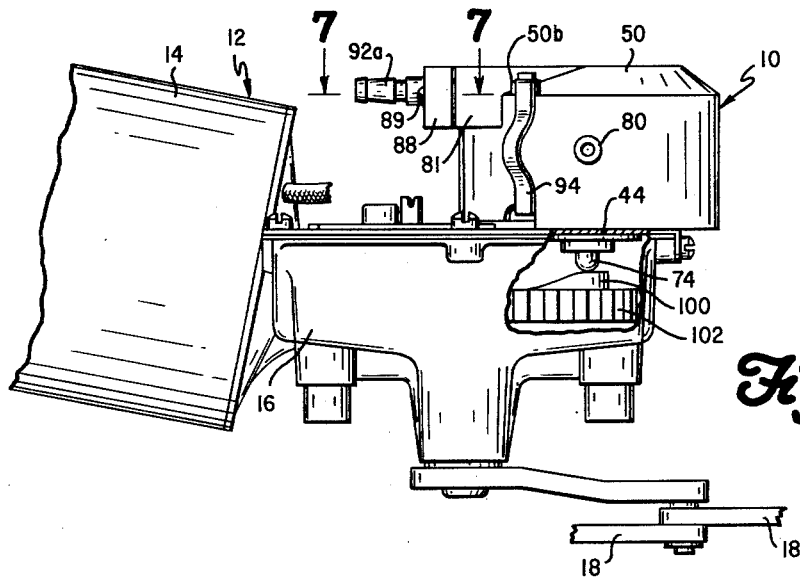
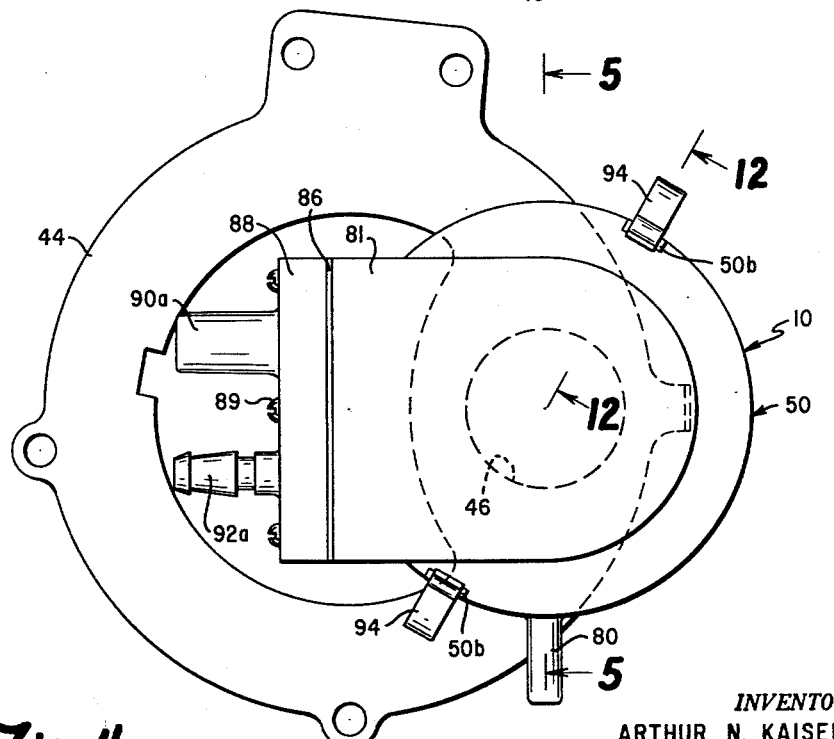

May 26, 1964 A. N. KAISER 3,134,125
WINDSHIELD WIPER AND WASHER ASSEMBLY
Filed May 21, 1962 4 Sheets-Sheet 3

INVENTOR.
ARTHUR N. KAISER
BY
Souther & Stoltenberg
ATTORNEYS

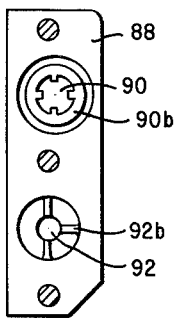
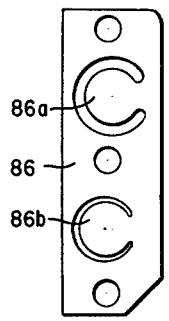
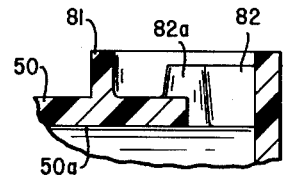
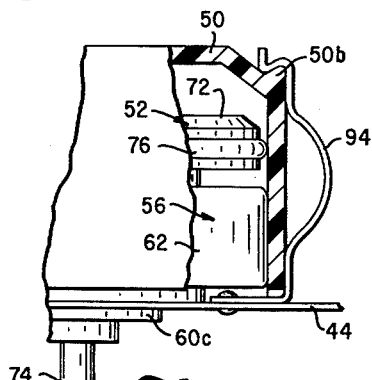
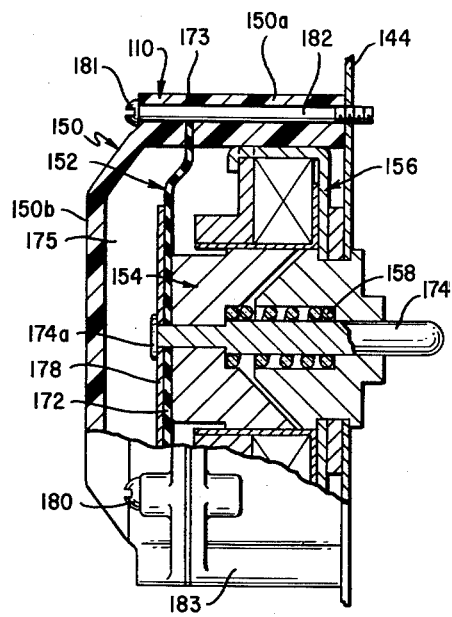
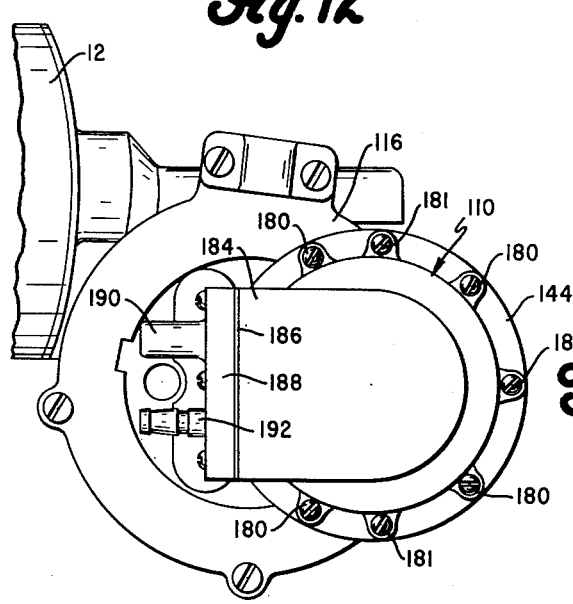

United States Patent Office 3,134,125
Patented May 26, 1964

3,134,125
WINDSHIELD WIPER AND WASHER ASSEMBLY
Arthur N. Kaiser, Fayetteville, N.Y., assignor to Eltra Corporation, Toledo, Ohio, a corporation of New York
Filed May 21, 1962, Ser. No. 197,193
3 Claims. (Cl. 15—250.02)

This invention relates to a windshield washer mechanism and more particularly to a combination windshield wiper and washer assembly for use on automotive vehicles.

There is an increasing demand for a simple, inexpensive windshield washer unit for automobiles which is reliable in operation, manually initiated to operate automatically, and thereafter manually controlled to provide for a desired number of timed strokes to squirt the necessary volume of liquid on a windshield surface. There are numerous types of windshield washer units presently produced in the automotive accessory industry but for various reasons, such as economy or faulty operating characteristics, the majority of them are not satisfactory. Many of the present units are separate and do not operate automatically, being provided with either, a hand or a foot operated plunger to force a washing liquid onto the windshield, which is not desirable because it requires too much attention of the driver. The fact that many of the present washer units are not connected to the wiper mechanisms and do not operate automatically also means that the washing liquid is not directed onto a vehicle windshield in co-ordinated relation with the reciprocation of the wiper blades. Washer and wiper mechanisms operating in timed relation will provide a maximum cleaning advantage with a minimum volume of liquid. Another undesirable characteristic of some pump units is their inability to survive freezing temperatures, because they have not been provided with expansion features to compensate for expansion of frozen liquid trapped in the pump mechanism, which oftentimes causes breakage and results in costly repairs to the pump mechanism or a complete replacement of the pump.

The invention contemplates a windshield washer unit having a reciprocating pump which is operated in the suction direction by a solenoid and in the pumping or exhaust direction by a cam actuating a piston plunger operated by the wiper motor.

The invention comprehends a windshield washer unit combined with a windshield wiper unit and having a washer pump whose operation is manually initiated and which is reciprocated in the suction stroke by a solenoid and in the exhaust stroke by a cam provided on a gear of the windshield wiper drive mechanism.

The invention includes an inexpensive but reliable windshield washer unit fabricated as a part of an electric windshield wiper which is manually controlled to be actuated thereby to squirt a liquid on the windshield of a vehicle in timed relation with the inboard and outboard strokes of windshield wiper blades, the operation of the washer unit continuing as long as the driver of a vehicle presses a push-button provided on the instrument panel of the vehicle on which the unit is installed.

It is, therefore, a principal object of this invention to provide a windshield washer unit that will obviate the various disadvantages of windshield washer units presently available.

It is another object of this invention to provide a combination windshield wiper and windshield washer unit, including a solenoid-operated pump which is also reciprocated on the exhaust stroke by a cam provided on a worm wheel of the windshield wiper driving mechanism.

It is another object of this invention to provide a windshield washer unit that will operate automatically after being initiated manually to force a liquid onto the windshield in timed relation with a stroke of the windshield wiper blades.

It is another object of this invention to provide a windshield washer unit which is inexpensive to manufacture, simple to install, reliable in operation, resistant to damage from frozen cleaning fluid or other obstructions in the system, and requires a minimum of attention by a driver during operation.

Other objects and advantages of this invention relating to the arrangement, operation and function of the related elements of the structure, to various details of construction, to combinations of parts and to economies of manufacture will be apparent to those skilled in the art upon consideration of the following description and appended claims, reference being had to the accompanying drawings forming a part of this specification wherein like reference characters designate corresponding parts in the several views.

In the drawings:

FIG. 3 is another elevation, partly broken away, showing one driving means for the windshield washer pump;

FIG. 4 is an elevation showing the pump and motor unit with relation to a mounting plate;

FIG. 9 is an elevational view taken on line 9—9 of FIG. 7;

FIG. 10 is a partial sectional view of an inlet port taken on line 10—10 of FIG. 8;

FIG. 11 is an elevation of a valve member;

FIG. 12 is an elevation, partly in section, taken on line 12—12 of FIG. 4 showing an expansion means for the pump assembly;

FIG. 13 is a view similar to FIG. 5 showing a modification of the invention with the electromagnet energized and the pump at the end of the suction stroke; and FIG. 14 is a view similar to FIG. 2 showing the modification assembled with the wiper motor and gear mechanism.

Figure 1:
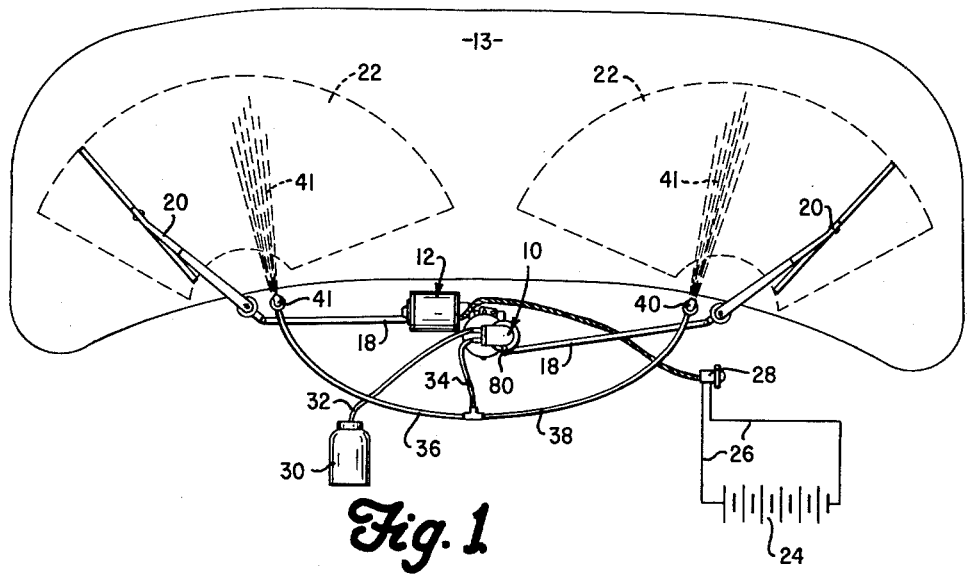
FIG. 1 is a schematic view showing the invention as related to an automotive vehicle.
Figure 2:
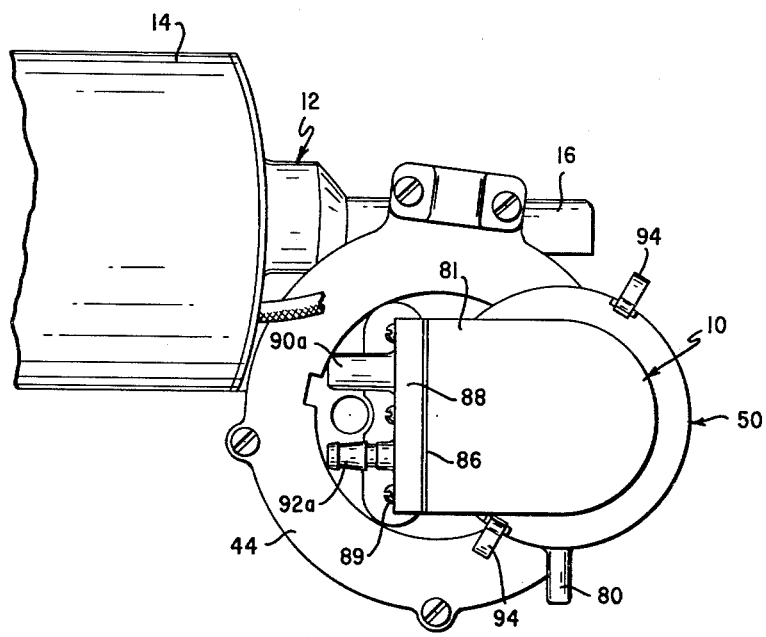
FIG. 2 is an elevation showing a combined windshield washer pump and windshield wiper motor unit.

Referring to the drawings, particularly FIGS. 1, 2, and 3, a windshield washer pump unit 10 is shown which is integrally mounted on a variable speed electric windshield wiper drive unit 12. A schematic view in FIG. 1 shows the washer and wiper elements mounted as a unit with relation to a vehicle windshield 13. The wiper unit comprises an electric motor 14, a gear box 16 mounted on one end of the motor integrally formed with the end head, two connecting rods 18 reciprocated by a driven eccentric on the gear box, and two oscillating wiper arm and blade assemblies 20 which are actuated by the connecting rods 18 through suitable pivots. Two wipe patterns 22 are represented in phantom on the windshield 13 to better illustrate the relationship of the wiper blade action and the spray of washing liquid. The wiper motor is controlled by an electric switch and circuit arrangement (not shown) which is disclosed in Patent 2,882,736 and is not a part of this invention. The wiper motor and related driving and wiping mechanism is conventional and also not a part of this invention, except for a driving and mounting relationship with the windshield washer pump unit 10, which will be better understood hereinafter.

The unit including the wiper motor and the washer element is supplied with an electric current from a vehicle battery 24 through a circuit 26 and a conventional manually-operated switch 28 mounted on the instrument panel of the vehicle. Units incorporating the invention may be installed on vehicles and operated with a single control knob having the combined features of a rotating action to mechanically position an electric switch for energizing the wiper unit and the same knob being capable of being rotated further against a spring bias to control the electric circuit of the washer unit. This arrangement of a single control for both units results in a one hand operation which is a desirable feature for the convenience of the operator.

The pump 10 is supplied with a washing liquid from a reservoir 30 through a tube 32. The liquid is forced by the pump through tubes 34, 36 and 38 to two jet type nozzles 40 mounted on the cowl to direct a liquid spray 41 onto the windshield 13.

Figure 5:
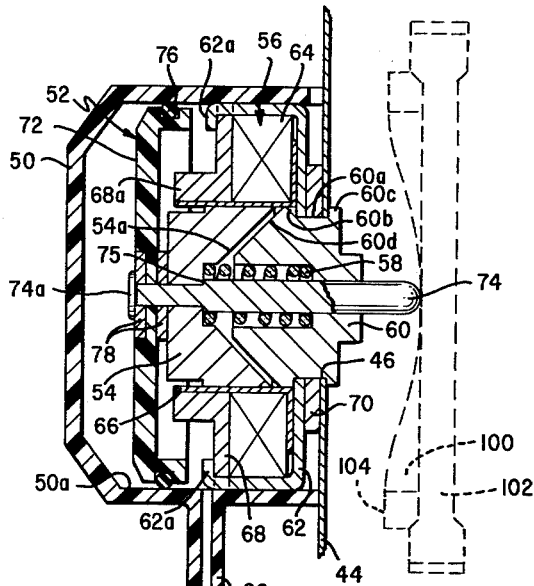
FIG. 5 is a sectional view of one type of the pump assembly taken on line 5—5 of FIG. 4 showing the pump at the end of its suction stroke.

Referring now to FIGS. 3, 4, and 5, the gear box 16 is provided with a cover plate 44 haivng an aperture 46, over which the pump unit 10 is mounted. The cover plate 44 also provides a mounting for an electric switch which controls the wiper motor for off-glass parking, the details of which are shown and described in Patent 2,882,-736, and will not be described further hereinafter. The mounting means of the pump unit will be further described hereinafter.

The pump unit 10 comprises a cup-shaped plastic housing 50, a piston assembly 52 including an armature 54, operable therein, and a magnetic field coil assembly 56. A comparatively light coil spring 58 is located in suitable recesses in the armature 54 and a pole piece 60 to bias the armature and piston assembly to the right (FIG. 5). The magnetic field assembly includes the central pole piece 60, an outer cup-shaped member 62, both of magnetic material, a solenoid coil 64 mounted in the member 62, central guide sleeve 66 of non-magnetic material for the armature 54 and a closure plate 68 of magnetic material having an upwardly projecting flange 68a embracing the sleeve 66. The armature 54 and the pole piece 60 are provided with conical cooperating surfaces 54a and 60d to improve the operating characteristics of the solenoid. The cup-shaped magnetic member 62 in which the coils is mounted has integral tabs 62a which are bent over a peripheral edge of the plate 68 during the assembly of the members to provide a means for holding the assembled members together.

The pole piece 60 has an annular recessed area 60a formed by an integral shoulder 60b, and a second outwardly-turned flange 60c formed by rolling over or peening a portion of the member 60 that projects through the aperture 46, which provides a means for mounting the pump unit on the cover plate 44 of the gear housing 16 as shown in FIG. 5. A spacer plate 70 is positioned in the assembly between the member 62 and the plate 44.

The piston assembly 52 includes a plastic circular piston head 72, a central plunger rod 74, and the concentric armature 54. The piston head is assembled with the armature by the plunger rod 74 with two supporting washers 78 between a shoulder 75 and a peened-over end 74a of the plunger rod. An O ring 76 positioned in an annular groove in the perimeter of the piston head provides a liquid seal between the piston and an inner cyclinder wall 50a of the housing 50.

The housing 50 has an integral downwardly-projecting tube 80 communicating with the pump chamber behind the piston 72 which provides a means for liquid to drain from the pump if any should leak past the O ring 76 and be trapped in the pump. This is a safety feature to prevent damage to the pump as a result of the trapped liquid freezing during extremely cold weather.

Figure 7:
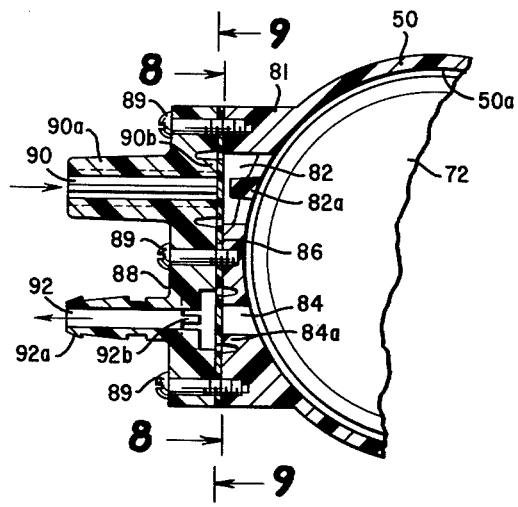
FIG. 7 is a partial sectional view of the pump valving means taken on line 7—7 of FIG. 3.
Figure 8:
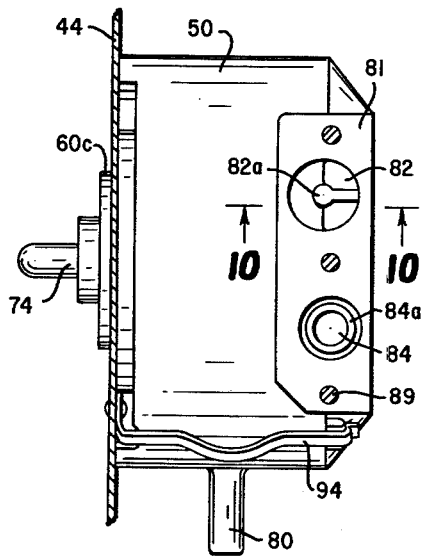
FIG. 8 is an elevational view taken on line 8—8 of FIG. 7.

The pump housing 50 is also provided with an integral rectangular boss 81 (FIG. 7) projecting outwardly from the housing which has inlet and outlet ports 82 and 84, respectively, molded therein which communicate with the pump chamber formed on the forward side of the piston 52. A valve sheet 86 of flexible gasket material is provided for the ports and held in position between the flat outer face of the boss and the flat lower face of a valve retaining member 88 by bolts 89 to provide a seal between the parts. The valve retaining member 88 is also provided with corresponding inlet and outlet ports 90 and 92 which are in respective alignment with the inlet and outlet ports 82 and 84 in the boss 81. The ports 90 and 92 are in communication with two projecting tube-like projections 90a and 92a which are provided for connecting to tubes 32 and 34 (FIG. 1) from the pump.

The valve sheet 86 is cut to provide two integral flap valves 86a and 86b (FIG. 11) which open or close the inlet and outlet ports by cooperating with sealing surfaces 84a and 90b, depending on the direction of flow of the liquid. The flap valves 86a and 86b are limited in their movement away from the sealing surfaces by projections 82a and 92b. Valves of this type are well known in the art need not be described further.

A spring clip 94 is provided (FIG. 12) which holds the pump housing 50 in an assembled position on the cover plate 44. The clip 94 is permanently affixed at its lower end to the plate 44 by riveting, and is provided with a reversely-bent portion at its opposite end which is forced by deflection of the spring over an integral projection 50b of the housing 50. This arrangement is another safety feature in that it compensates for expansion of frozen liquid that might possibly be trapped in the pump when the pump is not in use and is subjected to freezing temperautres. It has been determined that two such clips will retain the housing in assembled position during normal use and still allow the housing to raise if liquid is trapped in the pump and then freezes.

Figure 6:
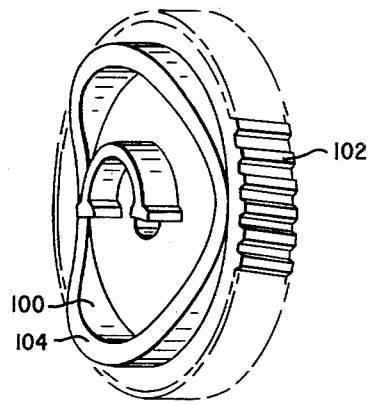
FIG. 6 is an isometric view of a worm wheel including a driving cam for the washer pump.

In the operation of the pump (FIGS. 3, 5, and 6) the piston 72 is actuated for an intake or suction stroke by the action of the solenoid 64 and for an exhaust stroke by an annular conccentric cam 100 on a worm wheel 102 with which the stem 74 is in contact. The worm wheel 102 is located in the gear box 16 and is driven by the electric motor 14 to operate the oscillating wiper blades. During operation of the windshield wipers, the worm wheel makes one revolution for a complete cycle of oscillation of the wiper blades, that is, an inboard stroke and an outboard stroke of the blades. The annular cam 100 on the face of the worm wheel has two axially-disposed high areas diametrically opposite each other and two low areas also diamtertically opposite each other. These high and low areas of the cam flow smoothly together in a smooth cam surface 104 and are disposed in relation to a plane through the worm wheel transverse to the axis of the wheel. The continuous cam surface 104 is at selected times contacted by the inner end 74b of the plunger 74 when the solenoid 56 is energized to provide a suction stroke provided the low of the cam allows such movement of the piston 72. When the pump is not operating, the spring 58 maintains the piston assembly, including the plunger 74 to the left (as viewed in FIG. 5), so that the plunger end 74b will clear the cam surface 104 to allow the wiper unit to be used alone.

Assuming that the wiper blades are operating and liquid is desired on the windshield surface, the operator presses the push-button switch 28 closing the circuit 26 from the battery to the solenoid coil 64. This will create a magnetic flux in the field assembly 56 and tends to draw the armature 54 and the piston assembly to the right (FIG. 5) against the action of the coil spring 58, and places the plunger end 74b against the cam surface 104 on the worm wheel, which contact is maintained as long as the operator maintains the push-button switch 28 closed. As the worm wheel rotates, the high portions of the cam 100 will force the piston assembly to the left against the magnetic attraction of the solenoid 64 for the exhaust or discharge stroke. As the low portions of the cam 100 approach the plunger end 74b, the piston assembly will be drawn to the right by the solenoid to maintain contact to provide the suction stroke. This procedure will continue to draw the liquid from the reservoir 30 and force a spray 41 onto the windshield 13 as long as the operator presses the push-button 28. A desirable feature is the fact that the operator can control the volume of liquid sprayed on the windshield by simply pressing or releasing the push-button control.

The two high portions of the cam 100 are so positioned in the assembly to provide, during one revolution of the worm wheel 102, a liquid spray which is co-ordinated with the wiper blade movement, so that the spray will occur just ahead of the blade for both the inboard and outboard movement of the blade. An advantage of using the co-ordinated gear and cam arrangement to provide the exhaust or discharge stroke of the pump is that the liquid spray will always occur in timed relation with the movement of the wiper blades regardless of the speed of the blades.

When the operator releases the push-button 28, the circuit 26 will be opened and the solenoid coil 64 de-energized. The spring 58 will then urge the piston 72 to the left to an extreme exhaust position, spewing any liquid remaining in the pump out of the jets. This clears the plunger 74 from contact with the rotating cam 100, thus eliminating any objectionable clicking noise that might result from such contact when only the wiper unit is operating. It also exhausts the pumping chamber between the head of the piston and the housing during idle periods of the washing unit, thus reducing the possibility of damage to the pump that could result from the expansion of frozen liquid. If a certain amount of liquid remains in the pump and it freezes, the spring clips 94 will allow the housing to raise to compensate for the expansion, as described hereinbefore.

A modification of the invention is shown in FIGS. 13 and 14. In this construction, a diaphragm type pump is disclosed using substantially the same principle to actuate the pump as that used to actuate the piston type pump described hereinbefore. That is, a solenoid actuates the pump for an intake stroke, a cam actuates a plunger member connected to the pump for an exhaust stroke. In the drawings, a pump assembly 110 is shown mounted to a cover plate 144 for the worm gear housing. The diaphragm is a movable wall for the pumping chamber for the purpose of expanding and collapsing the chamber during pumping.

The pump assembly comprises a two-piece plastic housing 150, a diaphragm assembly 152 including an armature 154, and a solenoid assembly 156. The solenoid assembly 156 is identical to the solenoid assembly 56 of the first modification shown in FIG. 5 and, therefore, will not be described in detail. A coil spring 158 for the diaphragm assembly is also included for the same purpose as spring 58 in the first modification.

The diaphragm assembly 152 includes a diaphragm member 172 formed of a suitable flexible resilient material such as neoprene, a plunger rod 174, a washer member 178, and the armature 154. The elements of the assembly are mounted together by peening over an end 174a of the plunger in the same manner as before. The two-piece housing 150, comprising an annular housing portion 150a and a cup-shaped cover portion 150b, provides a conventional means of clamping and sealing the outer peripheral portion 173 of the diaphragm 172 between them which establishes a sealed pumping chamber 175 within the cup-shaped cover 150b. The housing assembly, including the diaphragm clamped between the two portions 150a and 150b, is held together with suitable bolts 180, and the entire pump assembly is mounted to the closure plate 144 of the gear box 116 by additional bolts 181. The bolts 181 are positioned in aligned holes 182 provided in integral bosses 183 of the housing 150.

The valve details of this modification are the same as those previously described with reference to the first modification, including the laterally extending boss 184 on the cover member 150b, the valve element 186 having the same cutouts to provide flap valves and the valve cover member 188 having the hose connectors 190 and 192. The connections to the jets on the cowl and the storage tank for liquid spray material is the same as in the first modification.

The operation of the diaphragm type pump is identical to the operation of the piston type pump, in that the suction stroke of the pump is provided by the pull of the solenoid on the armature, while the discharge stroke is provided by the cam on the worm gear. The function of the coil spring 158 which biases the armature and diaphragm to discharged position of the pump also exhausts the washing liquid from the pumping chamber at the end of a washing cycle, thus preventing damage to the pump during extremely cold weather. Furthermore, the diaphragm elasticity forms a safety factor against frozen cleaning fluid or plugged lines in that when the pressure becomes abnormal, the diaphragm, being resilient, expands and keeps the pressure within the designed and safe pressure limitation to prevent damage to the pump structures.

It is to be understood that the above detailed description of the present invention is intended to disclose an embodiment thereof to those skilled in the art, but that the invention is not to be construed as limited in its application to the details of construction and arrangement of parts illustrated in the accompanying drawings since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. In a combination windshield wiper motor and washer pump, a pumping chamber for the pump including a cylindrical housing having a movable wall to create a suction stroke and a discharge stroke for spewing cleaning liquid on the windshield, a cover member on the housing, inlet and outlet valves for the pump chamber cooperating with the cover member, driven means on the wiper motor including an eccentric arm to drive the windshield wiper, a cam means in a predetermined angular relation on the driven means relative to the eccentric arm adapted to move with the movable wall of the pumping chamber at selected times, resilient means to slowly urge the movable wall of the pumping chamber to discharge position when filled with liquid, and solenoid means mounted in the housing having an armature acting on the movable wall against the bias of the resilient means to provide a suction stroke for the pumping chamber and to selectively create a mechanical contact between a portion of the movable wall of the pumping chamber and the cam means on the driven means, whereby the driven means with the resilient means drives the pump only during the spewing discharge stroke to spew cleaning liquid in front of the windshield wiper during its motion across the windshield, the solenoid means as controlled by the cam means by the mechanical contact is the only means for driving the pump for the suction stroke.

2. In a combination windshield wiper motor and washer pump, a pumping chamber for the pump including a cylindrical housing having a movable wall to create a suction stroke and a discharge stroke for spewing cleaning liquid on the windshield, a cover member on the housing, inlet and outlet valves for the pump chamber cooperating with the cover member, driven means on the wiper motor including an eccentric arm to drive the windshield wiper, means to resiliently mount the housing on the motor, a cam means in a predetermined angular relation on the driven means relative to the eccentric arm adapted to move with the movable wall of the pumping chamber at selected times, resilient means to slowly urge the movable wall of the pumping chamber to discharge position when filled with liquid, and solenoid means mounted in the housing having an armature acting on the movable wall against the bias of the resilient means to provide a suction stroke for the pumping chamber and to selectively create a mechanical contact between a portion of the movable wall of the pumping chamber and the cam means on the driven means, whereby the driven means with the resilient means drives the pump only during the spewing discharge stroke to spew cleaning liquid in front of the windshield wiper during its motion across the windshield, the solenoid means as controlled by the cam means by the mechanical contact is the only means for driving the pump for the suction stroke.

3. In a combination windshield wiper motor and washer pump, a pumping chamber for the pump including a cylindrical housing having a movable wall to create a suction stroke and a discharge stroke for spewing cleaning liquid on the windshield, a cover member on the housing, inlet and outlet valves for the pump chamber cooperating with the cover member, driven means on the wiper motor including an eccentric arm to drive the windshield wiper, means to resiliently mount the housing on the motor, a cam means in a predetermined angular relation on the driven means relative to the eccentric arm adapted to move with the movable wall of the pumping chamber at selected times, resilient means to slowly urge the movable wall of the pumping chamber to discharge position when filled with liquid, solenoid means mounted in the housing having an armature acting on the movable wall against the bias of the resilient means to provide a suction stroke for the pumping chamber and to selectively create a mechanical contact between a portion of the movable wall of the pumping chamber and the cam means on the driven means, whereby the driven means with the resilient means drives the pump only during the spewing discharge stroke to spew cleaning liquid in front of the windshield wiper during its motion across the windshield, and vent means in the housing adjacent the solenoid, the solenoid means as controlled by the cam means by the mechanical contact is the only means for driving the pump for the suction stroke.

References Cited in the file of this patent

FOREIGN PATENTS

| | | |
|---|---|---|
| 860,087 | Great Britain | Feb. 1, 1961 |
| 1,060,728 | Germany | July 2, 1959 |